United States Patent [19]

Pugachev et al.

[11] Patent Number: 5,327,874

[45] Date of Patent: Jul. 12, 1994

[54] METHOD AND DEVICE FOR PREPARING FUEL-AIR MIXTURE FOR INTERNAL COMBUSTION ENGINE

[75] Inventors: Alexandr V. Pugachev, ul.Davydova d.3, kv. 101, Moscow 121293; Vasiliy N. Shatalov, Ryazan, both of U.S.S.R.

[73] Assignee: Alexandr Vasilievich Pugachev, Ryazan, U.S.S.R.

[21] Appl. No.: 64,101

[22] Filed: Jun. 30, 1992

[30] Foreign Application Priority Data

Sep. 18, 1991 [SU] U.S.S.R. ............... 5002331
Dec. 12, 1991 [SU] U.S.S.R. ............... 5013677
Mar. 26, 1992 [WO] PCT Int'l Appl. ........... PCT/RU92/00058

[51] Int. Cl.$^5$ ............................. F02M 31/00
[52] U.S. Cl. ................... 123/545; 123/547; 123/549; 123/558
[58] Field of Search ........ 123/543, 545, 546, 547, 123/549, 552, 558

[56] References Cited

U.S. PATENT DOCUMENTS

| | | | |
|---|---|---|---|
| 3,886,919 | 6/1975 | Freeman | 123/558 |
| 3,901,197 | 8/1975 | Noguchi et al. | |
| 3,945,352 | 3/1976 | Reimuller | 123/558 |
| 4,147,142 | 4/1979 | Little | |
| 4,151,821 | 5/1979 | Wichman et al. | 123/558 |
| 4,249,501 | 2/1981 | Ehresmann | 123/552 |
| 4,476,840 | 10/1984 | Budnicki et al. | 123/558 |
| 4,930,484 | 6/1990 | Binkley et al. | 123/546 |
| 5,219,399 | 6/1993 | Brana | 123/549 |

FOREIGN PATENT DOCUMENTS 2613348 7/1980 Fed. Rep. of Germany .
3607007 9/1987 Fed. Rep. of Germany .
493073 11/1975 U.S.S.R. .

Primary Examiner—Tony M. Argenbright
Assistant Examiner—M. Macy
Attorney, Agent, or Firm—Collard & Roe

[57] ABSTRACT

The present invention relates to the engine-building industry and can find application in the fuel feed system of internal combustion engines for preconditioning part of the flow of a rich fuel-air mixture fed to the main flow to decompose liquid fuel and convert it into a gas. A technical aim of the present invention consists in an increased fuel economy of the engine, reduced toxicity of exhaust gases, and use of a cheaper low-octane fuel. A method for preparing fuel-air mixture consists in that the flow of an overrich fuel-air mixture is additionally heated, before mixing it with the other flow of fuel-air mixture, by passing it through a promoter heated above the mixture ignition temperature, thus providing repeated contact of the flow with the promoter surface. A device comprises a heat-exchanger 1 communicating, via an intake piping 3, with the engine exhaust manifold, a proportioner 5 of the components of the fuel-air mixture being handled provided with an air piping 6, an exhaust gas piping 7, and a fuel piping 8. The proportioner 5 communicates, via a control member 10 and a mixing nozzle 9, with the inlet mixture-handling loop of the heat-exchanger 1. A promoter 12 is provided in the heat-exchanger outlet nozzle, arranged in a spaceless relation thereto and being in fact a heating element having a well-developed surface and may be variously embodied.

11 Claims, 2 Drawing Sheets

METHOD AND DEVICE FOR PREPARING FUEL-AIR MIXTURE FOR INTERNAL COMBUSTION ENGINE

TECHNICAL FIELD

The present invention relates in general to the engine-building industry and more specifically it concerns preparation of fuel-air mixture for internal combustion engines.

BACKGROUND ART

At present a routine method for preparing fuel-air mixture consists in producing a hydrogen-containing gas from fuel and feeding said gas in the fuel-air mixture.

One prior-art method for preparing fuel-air mixture for an internal combustion engine is known to effect in three stages, that is, at the first stage the fuel is partially decomposed by virtue of the heat of exhaust gases, at the second stage the fuel is preheated by said gases, and at the third stage catalytic fuel decomposition occurs. To promote catalytic fuel decomposition at said stage the fuel is additionally preheated by exhaust gases (U.S. Pat. No. 4,147,142).

However, the use of only the heat of exhaust gases for fuel decomposition is inadequate to attain an efficient and stable running of the fuel decomposition process.

One more state-of-the-art method for preparing fuel-air mixture for an internal combustion engine is known to consist in splitting the mixture into two flows, that is, a greater main flow and a smaller auxiliary flow, separating part of the mixture from the auxiliary flow, and burning the latter in order to heat and evaporate the remainder part of the auxiliary flow by the resultant gases, followed by mixing both parts of the auxiliary flow and feeding an integrated flow to the catalytic chamber. Before being fed to the combustion chamber the preconditioned auxiliary flow of the mixture is intermixed with the main flow of the fuel-air mixture (U.S. Pat. No. 3,901,197).

Use of an open fire, according to the known method, for burning part of the fuel from the fuel-air mixture adds to the efficiency of thermal fuel decomposition, however, it increases fuel consumption and is hazardous. A danger of flame travel and an outbreak of fire arises when an engine runs unsteadily or misses, as the velocity of flame travel in the fuel-air mixture may exceed the flow velocity of the mixture itself.

Moreover, unburnt hydrocarbons of the $C_nH_{n+2}$ type are left after burning an enriched mixture, which are deposited in the catalyst pores as soot and coke, thus putting the catalyst out of order.

As is evident from specification of the heretofore-known methods for decomposition of liquid fuel, said methods involve use of catalysts which are not only expensive components of the fuel-air preparation device but also require periodical replacement, inasmuch as anti-knocking dopes present in the fuel are detrimental to catalysts.

Still one more prior-art method for preparing fuel-air mixture for internal combustion engines is known to be the nearest in spirit to the herein-proposed method and consists in that two flows of fuel-air mixture are established. One of the two flows is overenriched below the ignition range and heated to a temperature of 400°–800° C. with exhaust gases having a temperature of about 750° C. to obtain carbon monoxide and hydrogen-containing gases and mixed with the other flow before being fed to the engine cylinder (DE A1 3,607,007).

However, the fuel decomposition process is known commonly to proceed most efficaciously at a temperature about 850° C. which cannot be reached by the method in question.

Known in the present state of the art are devices for carrying into effect the methods for preparing fuel-air mixture for internal combustion engines, comprising as a rule heat-exchangers for preheating fuel-air mixture by the heat of exhaust gases, and reactors with a catalyst.

To provide more efficient process for decomposition of the fuel molecules use is made of an additional heating arrangement of fuel-air mixture to a higher temperature than that of exhaust gases.

One prior-art device for preparing fuel-air mixture is known to comprise an additional heating arrangement with an ignition spark and a burner to which the fuel-air mixture is fed and burns therein in an open fire, after which said mixture is fed to the reactor with a catalyst, wherein part of the liquid fuel molecules get decomposed (DE B2, 2,613,348).

One more prior-art device for preparing the fuel-air mixture for internal combustion engines is known to comprise a reactor situated in the exhaust manifold close to the exhaust valves and shaped as a blind-end (at the side facing said exhaust valves) pipe running axially and centrally of the exhaust pipe. Fuel, water, and air are fed, in a stringently fixed ratio, to the reactor nearby its blind-end. In its alternative version, the known device comprises a heat-exchanger located also in the exhaust pipe past the reactor as along the direction of flow of the engine exhaust gases (DE A1 3,607,007).

Low efficiency of the processes proceeding in the known device has been discussed above.

It is common knowledge that high temperatures of exhaust gases occur only at the first instant of the exhaust stroke, then their temperature drops abruptly. Taking into account the transient nature of the exhaust process (which equals one-fourth of a crankshaft revolution per two complete revolutions thereof), as well as of the fact that the temperature of a heat-transfer agent used for preconditioning the fuel-air mixture without its preheating is as low as 750° C. compared to 900° C. with preheating. One cannot expect a stable process of decomposition of the liquid fuel molecules.

Furthermore, having impinged upon the front reactor wall at the hottest spot thereof, the fuel particles thereafter might not collide with said wall or might come in contact with colder reactor areas, that is, only a once-through process of decomposition of the fuel molecules is possible, which is quite ineffective. On the other hand, provision of a special pump for feeding the fuel-air mixture to the reactor adds to the cost of the device as a whole, whereas the higher temperature of exhaust gases involves increased fuel consumption.

A device for preconditioning the fuel-air mixture for internal combustion engines that is nearest in spirit to that herein-proposed, comprises a double-loop heat-exchanger having an inlet and an outlet piping, a proportioner of the components of the mixture being treated, and an igniter provided at the outlet of the first loop of the heat-exchanger before the catalyst-containing chamber. The input and output pipings of the second loop of the heat-exchanger are connected respectively to the engine exhaust pipe and to the surrounding atmosphere, and the mixing nozzle of the proportioner is connected to the first heat-exchanger loop through a controlled member (SU A1 493,073).

As is evident from the above discussion of the heretofore-known devices, use is therein made of catalysts on a platinum support which renders said devices too expensive, whereas use of a heat-transfer agent hotter than the engine exhaust gases makes the device in question uneconomical, too.

Disclosure of the Invention

The present invention has for its principal object to prepare the fuel-air mixture for internal combustion engines without the use of an expensive catalyst, additional igniters or pumps, and to render the internal combustion engine more economical in fuel consumption and to reduce the toxicity of exhaust gases.

As far as the method is concerned, the foregoing object is accomplished due to the fact that there are formed two flows of the fuel-air mixture. One of which is overenriched below the ignition range, preheated by exhaust gases to obtain carbon monoxide and hydrogen-containing gases, and mixed with the other flow of the fuel-air mixture before being fed to the engine cylinders. The flow of the overrich fuel-air mixture is additionally heated before mixing it with the other flow, by passing it through a promoter heated above the mixture ignition temperature, whereupon thermal cracking of the fuel is performed in the boundary layer of said promoter by multiple repeated fuel contact with the promoter surface.

An additional enhancement of the engine efficiency and fuel economy is attained due to adding to the fuel-air mixture being handled such additives as exhaust gases, water, and a low-octane fuel.

As far as the device is concerned, the foregoing object is accomplished due to the fact that the device for preparing fuel-air mixture for internal combustion engines comprises a double-loop heat-exchanger having an inlet piping and an outlet piping, a proportioner of the components of the mixture being handled, and an incandescence element provided at the heat-exchanger outlet. The inlet and outlet pipings of the gas-handling loop of the heat-exchanger are connected respectively to the engine exhaust pipe and to the surrounding atmosphere, whereas the proportioner mixing nozzle communicates, via a control member, with the mixture-handling loop of the heat exchanger. The incandescence element is of the non-igniting type and appears as a promoter having an enlarged heatable surface area and is accommodated in the outlet nozzle of the heat-exchanger mixture-handling loop in a spaceless relation thereto. The promoter can be mounted pivotally about its own axis.

The promoter may vary both in construction and shape.

In particular, the promoter may be embodied as follows:

as a cylinder accommodating a rod coaxial therewith, both the cylinder and rod being made from a heat-resistant insulant, a single- or multiturn coil being wound onto the rod and snugly applied between the cylinder and the rod;

as a ceramic tube accommodating a cluster of coils wound together and having their axis parallel to that of the tube;

as a heat-resistant electrical-insulant housing.

The enlarged heatable surface area of the promoter may be established by:

a number of wire rows placed consecutively in a zigzag pattern in the housing as along the flow of the fuel-air mixture, the wire rays of each next row mutually intersecting in plan;

a number of parallel coils wound in plan into the Archimedean spiral and placed consecutively in a cylindrical housing as along the flow of the fuel-air mixture;

a porous spatial flat element;

a porous spatial cylindrical element.

BRIEF DESCRIPTION OF THE DRAWINGS

To promote the understanding of the present invention given below, a specific exemplary embodiment thereof with reference to the accompanying drawings is provided, wherein.

BEST METHOD OF CARRYING OUT THE INVENTION

Figure 1:
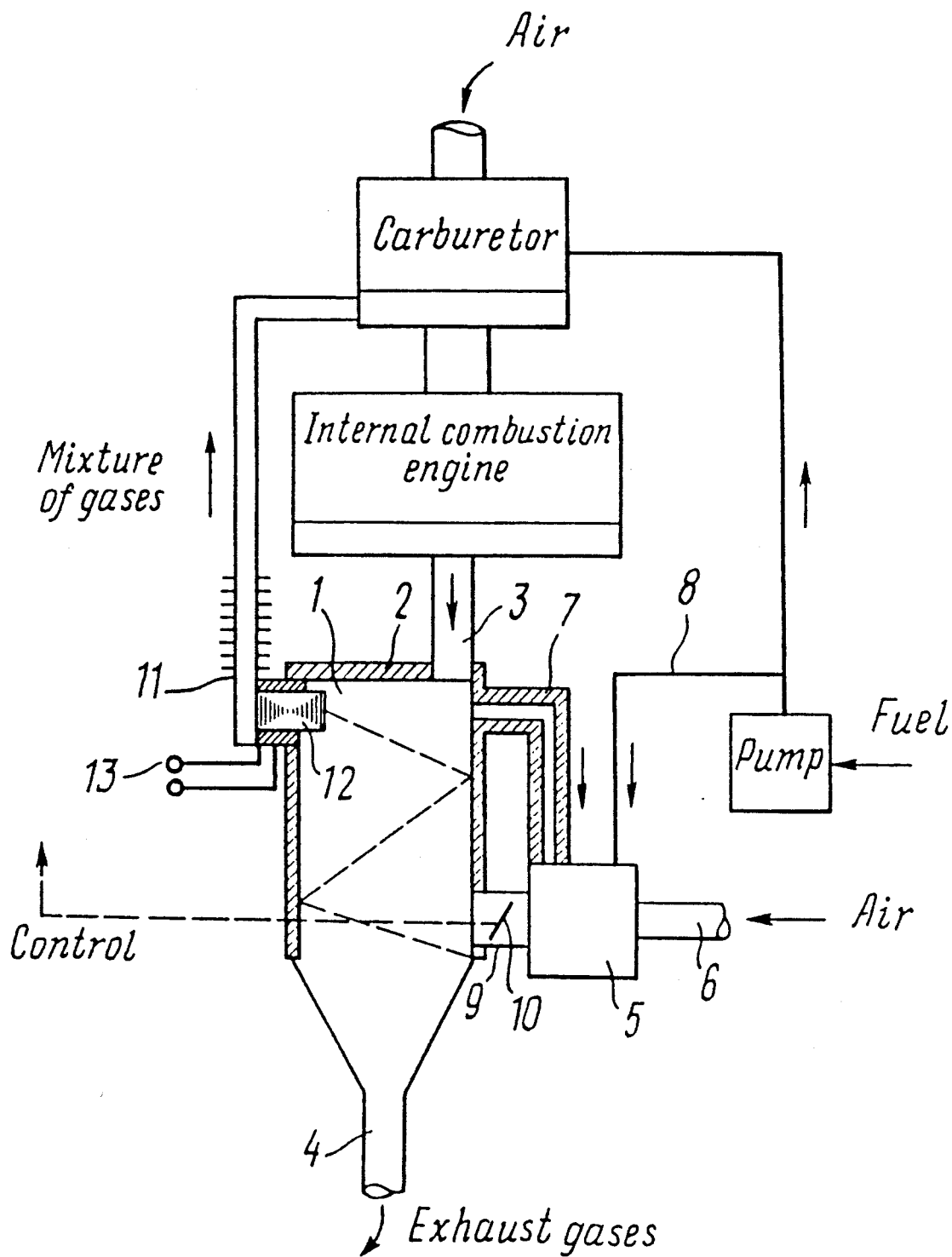
FIG. 1 is a schematic functional diagram of the device, according to the invention.

The method for preparing the fuel-air mixture for internal combustion engines consists in that there are formed two flows of the fuel-air mixture, one of which is overenriched below the ignition range, heated by exhaust gases to produce carbon monoxide and hydrogen-containing gases, and is then fed to a promoter preheated above the mixture ignition point.

Fuel particles on getting onto the activator are brought in contact with the hot surface thereof repeatedly under a deficit of oxidant leads to a repeated process of partial oxidation of the molecules of organic fuel ($C_8H_{18}$). Thus, the molecule starts decomposing, the separated molecules of C and H are combined with oxygen, that is, the partial oxidation reaction proceeds.

$$C_8H_{18} + nO_2 = nC_nH_{n+2} + nCO + nCO_2 + nH.$$

The original molecule turns into a lighter structure and gaseous CO, $CO_2$ and $H_2$ are disengaged. Thus, an endothermic decomposition reaction occurs.

Exhaust gases and water may participate in the thermal decomposition process.

When part of the $CO_2$-containing exhaust gases are added to the fuel-air mixture being prepared, a $CO_2$ decomposition reaction will occur;

$$CO_2 C = CO + CO.$$

Water decomposition occurs concurrently;

$$H_2O + C = CO + H_2.$$

Water may not only be contained in exhaust gases but may also be added to the fuel-air mixture purposely, with the result that an additional amount of CO and $H_2$ is produced.

After having been treated with the promoter the fuel-air mixture contains the following gaseous decomposition products: $CH_4$ (methane), $C_2H_6$ (ethane), $C_3H_8$ (propane), and $C_4H_{10}$ (butane), as well as CO, $H_2$, $CO_2$, and unused part of the exhaust gas components (provided that exhaust gases have been added to the mixture before its treatment with the promoter). Thus, the fuel being handled turns into a lighter gaseous phase.

The whole flow of the promoter-treated mixture is merged with the main flow of the lean fuel-air mixture and is then fed to the cylinders of an internal combustion engine.

The device for realization of the proposed method comprises a double-loop heat-exchanger 1 having a heat insulation 2, an intake piping 3 and an outlet piping 4 of hot exhaust gases of an internal combustion engine, a proportioner 5 of the components of the mixture provided with an air piping 6, an exhaust gas piping 7, and gasoline piping 8. The proportioner 5 communicates, through a mixing nozzle 9, with the fuel-air mixture heating channel in the heat-exchanger 1. A control member 10 is provided in the mixing nozzle 9 to control the rate of flow of the mixture being prepared. A promoter 12 is situated at the heat-exchanger 1 outlet or in an exhaust pipe 11, connected to an electric power source 13.

The gasoline piping 8 is connected to the gasoline pump of the internal combustion engine which feeds the fuel of the carburetor.

Figure 2:
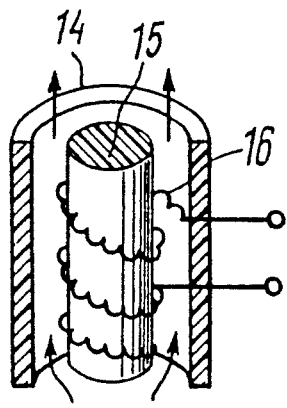
FIG. 2 is a first embodiment of the promoter construction having a rod-wound coil.

The promoter 12 may be shaped as a cylinder 14 (FIG. 2) and a rod 15 accommodated in said cylinder coaxially therewith, both being made of a heat-resistant insulant, such as ceramics, and a single- or multiturn coil 16 wound onto the rod 15 and tightly laid between the cylinder 14 and rod 15.

Figure 3:
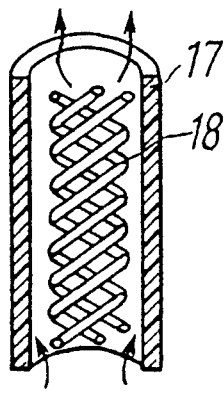
FIG. 3 is a second embodiment of the promoter construction featured by the wound-together coils.

The promoter 12 may also be made of a ceramic tube 17 (FIG. 3) accommodating a cluster of coils 18 wound together and tightly laid as along the direction of the mixture flow so that the cluster axis is parallel to the axis of the tube 17.

Figure 4:
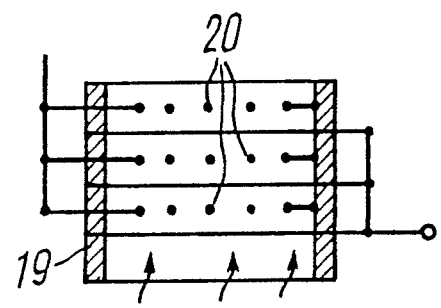
FIG. 4 is a third embodiment of the promoter construction featuring zigzag-arranged wire rows.
Figure 5:
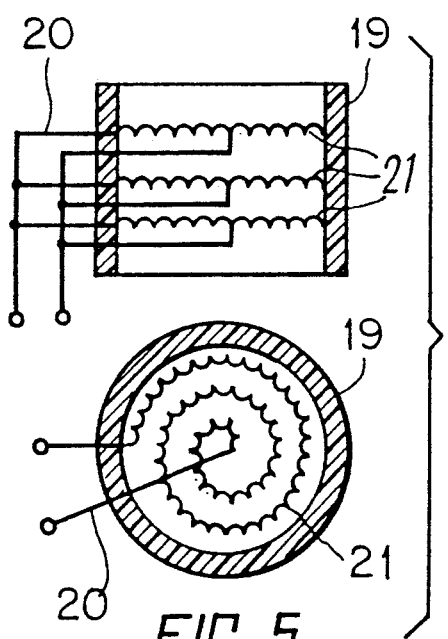
FIG. 5 is a fourth embodiment of the promoter construction featuring the coils wound in plan along the Archimedean spiral.

The promoter 12 may also be made in the form of a number of zigzag-laid rows of wire 20 (FIG. 4) arranged consecutively in a housing 19 as along the mixture flow, the rays of the wire 20 intersecting in plan to establish a space net which can also be formed by several rows of parallel coils 21 wound in plan into the Archimedean spiral (FIG. 5) and placed consecutively in a cylindrical housing.

Figure 6:
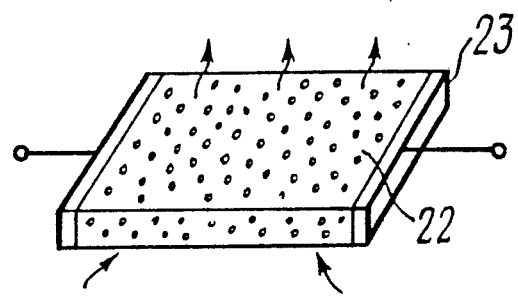
FIG. 6 is a fifth embodiment of the promoter construction featuring a porous spatial flat element.
Figure 7:
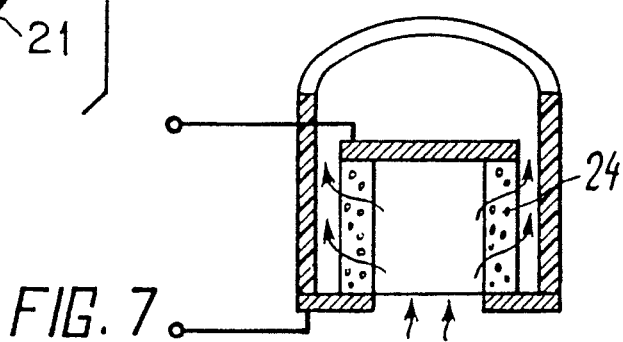
FIG. 7 is a sixth embodiment of the promoter construction featuring a porous spatial cylindrical element.

The enlarged heatable surface area of the promoter 12 may be formed by a porous spatial element shaped as a flat solid 22 enclosed in a housing 23 (FIG. 6), or as a cylindrical solid 24 (FIG. 7).

The device for preparing fuel-air mixture for internal combustion engines operates as follows.

A very lean fuel-air mixture is prepared in the main fuel-air system of the engine with the aid of a carburetor. A mixture of combustible gases is prepared from an overrich fuel-air mixture ($\alpha > 0.45$) in the auxiliary system consisting of the proportioner 5, the heat-exchanger 1, and the promoter 12. Said overrich mixture compensating for fuel shortage in the mixture prepared in the main system so as to bring the fuel-air ratio to a normal level for use in the internal combustion engine.

With the internal combustion engine running, fed to the proportioner 5 along the respective pipings 6, 7, and 8 are air, part of the exhaust gases, and gasoline (e.g., in an amount of 10–20% of the total one). The proportioner 5 prepares a fuel-overrich mixture having an excess-air coefficient $\alpha$ not over 0.45.

The heat exchanger may feature different flow patterns of gas currents.

the preheated fuel-air mixture is fed to the hot surface of the promoter 12. Getting the fuel-air mixture particles in contact with the hot surface of the promoter 12 under oxidant shortage results in partial oxidation of the molecules of an organic fuel ($C_8H_{18}$). It is as a result of such thermocontact cracking that the fuel molecules start decomposing.

The original fuel molecules turn into a lighter structure to give rise to gases.

The process of partial oxidation of the fuel molecules is repeated many times in the promoter 12 due to multiple contacting of the flow of the fuel-air mixture with the hot promoter surface, whereby the thermocontact cracking proceeds more vigorously.

A mixture of the resultant gases is fed along the pipe 11 to the intake engine manifold either directly or through the carburetor, to be mixed with the lean fuel-air mixture which feeds the internal combustion engine.

A positive effect of the practical implementation of the present invention manifests itself in fuel economy, use of a cheaper low-octane fuel, and in a reduced (by a factor of ten to fifteen) CO content of the engine exhaust gases and a lower content of nitrogen oxides.

Industrial Applicability

The present invention can find application in the engine-building industry manufacturing both vehicle and stationary internal combustion engines and may be used in designing new such engines and in those now under exploitation. A possibility arises of using a low-octane fuel for engines designed to operate on a high-octane fuel.

We claim:

1. A method for preparing a fuel-air mixture for an internal combustion engine comprising the steps of:
    establishing two flows of the fuel-air mixture, one of said flows being overrich;
    preheating said overrich flow using the exhaust gases of the engine to produce CO and hydrogen containing gases;
    additionally heating said overrich flow by passing said flow through a promoter heated above the mixture ignition temperature and bringing said overrich flow into multiple repeated contact with the promoter surface; and
    mixing said overrich flow with the other of said flows before being fed to the engine cylinders.

2. A method according to claim 1, additionally comprising the step of adding exhaust gases, water or a low octane flow to the overrich fuel-air mixture before said step of additionally heating said flow of overrich fuel-air mixture.

3. A device for preparing a fuel-air mixture for an internal combustion engine comprising:
    a double loop heat-exchanger having a gas-handling loop and a mixture-handling loop, each of said gas-handling and mixture-handling loops having an inlet piping and an outlet piping, said outlet piping of said mixture-handling loop having an outlet nozzle, said inlet piping of said gas-handling loop being connected to an engine exhaust pipe, said outlet piping of said gas-handling loop being connected to the surrounding atmosphere;

a proportioner for preparing the components of the fuel-air mixture, said proportioner having a mixing nozzle communicating with said mixture-handling loop of said double loop heat-exchanger;

a control member coupled to said mixture nozzle of said proportioner for controlling communication between said proportioner and said mixture-handling loop; and a promoter comprising an incandescence element disposed within said outlet nozzle of said mixture-handling loop in a spaced-apart relation thereto, said incandescence element being a non-igniting type and having an enlarged heatable surface area.

4. The device according to claim 3, wherein said promoter is pivotable about its own axis.

5. The device according to claim 3, wherein said promoter comprises a cylinder, said promoter having a rod arranged coaxially therethrough, and wherein said cylinder and said rod are made of a heat-resistant insulation, said rod having a coil wound thereon disposed between said cylinder and said rod.

6. The device according to claim 5, wherein said coil is a multiturn coil wound on said rod and disposed between said cylinder and said rod.

7. The device according to claim 5, wherein said coil is a single turn coil wound on said rod and disposed between said cylinder and said rod.

8. The device according to claim 3, wherein said promoter comprises a ceramic tube;

a cluster of coils wound together and disposed within said tube and having their axes parallel to the axis of the tube.

9. The device according to claim 3, wherein said promoter comprises a heat-resistant insulated housing and said enlarged heatable surface comprises a plurality of wire rows laid consecutively in a zigzag pattern in said heat-resistant housing, and along the flow of the fuel-air mixture, said wire rows of each next row intersecting in the same plane.

10. The device according to claim 3, wherein the enlarged heatable surface area of said promoter comprises a plurality of rows of parallel coils wound in the same plane into Archimedean spirals, and said spirals laid consecutively in a cylindrical housing, along the flow of the fuel-air mixture.

11. The device according to claim 3, wherein said enlarged heatable surface area of said promoter comprises a porous, spatial flat element enclosed in a housing.

* * * * *